US005312080A

United States Patent [19]

Mazur et al.

[11] Patent Number: 5,312,080

[45] Date of Patent: May 17, 1994

[54] FUEL REGULATOR MOUNTING PLATE AND FORMING PROCESS

[75] Inventors: Richard J. Mazur, Sylvania, Ohio; Robert L. Arno, Morenci, Mich.; Dennis J. Duden, Swanton, Ohio

[73] Assignee: Walbro Corporation, Cass City, Mich.

[21] Appl. No.: 850,986

[22] Filed: Mar. 12, 1992

[51] Int. Cl.[5] ....................... F16M 13/00; B21D 28/00

[52] U.S. Cl. ....................................... 248/300; 29/432; 248/674; 72/335

[58] Field of Search .................. 248/300, 674; 29/432; 72/412, 335, 333, 334, 336

[56] References Cited

U.S. PATENT DOCUMENTS

| | | | |
|---|---|---|---|
| 2,157,354 | 5/1939 | Sherman | 72/335 X |
| 3,365,926 | 1/1968 | Price | 72/335 X |
| 3,432,705 | 3/1969 | Lindveit | 248/674 X |
| 3,434,327 | 3/1969 | Speakman | 72/335 X |
| 4,072,039 | 2/1978 | Nakanishi | 72/335 X |
| 4,713,960 | 12/1987 | Gassaway | 72/412 |
| 5,144,709 | 9/1992 | Rooney | 72/335 |
| 5,159,826 | 11/1992 | Miyazawa et al. | 72/335 |

FOREIGN PATENT DOCUMENTS

| | | | |
|---|---|---|---|
| 2706849 | 11/1977 | Fed. Rep. of Germany | 72/335 |
| 2754563 | 6/1978 | Fed. Rep. of Germany | 72/335 |
| 1043473 | 11/1953 | France | 72/335 |

*Primary Examiner*—Karen J. Chotkowski
*Attorney, Agent, or Firm*—Harold F. Mensing

[57] ABSTRACT

A mounting plate for an attachment with an insertable plug type tubular connector and a process for making the plate. The mounting plate comprises a sheet metal plate having length, width and body thickness T with a tubular nipple member projecting from one side. The nipple member is cold formed plastically from the body of the plate by a stamping process utilizing a progressive die. One of the intermediate die members is shaped such that it produces a tubular preform having a distal end portion with a wall thickness greater than the wall thickness of the opposite end portion adjacent to the plate. A subsequent die member reduces the excess wall thickness and extends the tubular member to an axial length equivalent to at least 3T measured from the distal end of the neck member to the surface on the opposite side of said plate. Subsequently, another die member precisely finishes a feature located in close proximity to the nipple member.

7 Claims, 6 Drawing Sheets

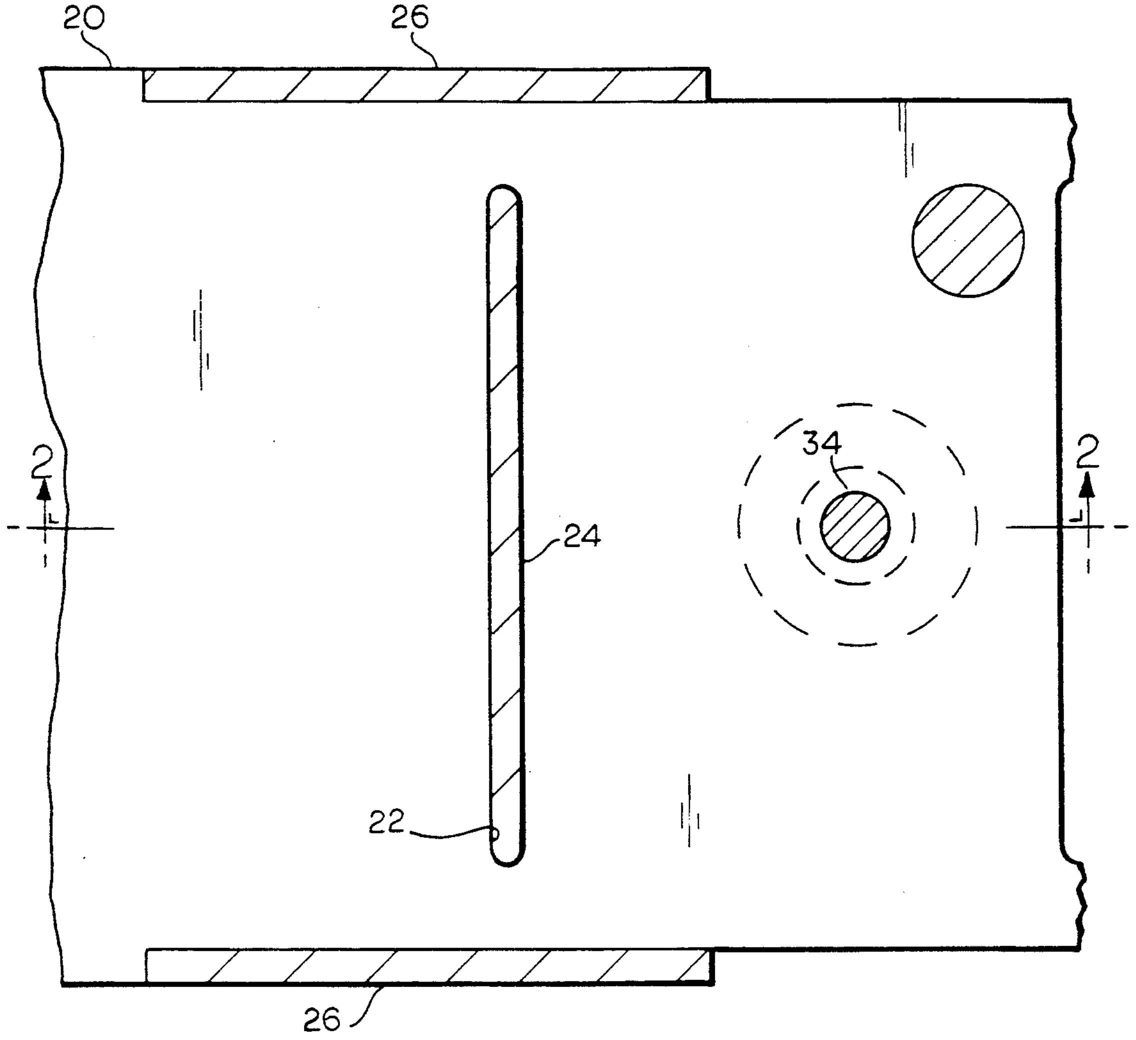
FIG. 1
FIG. 2
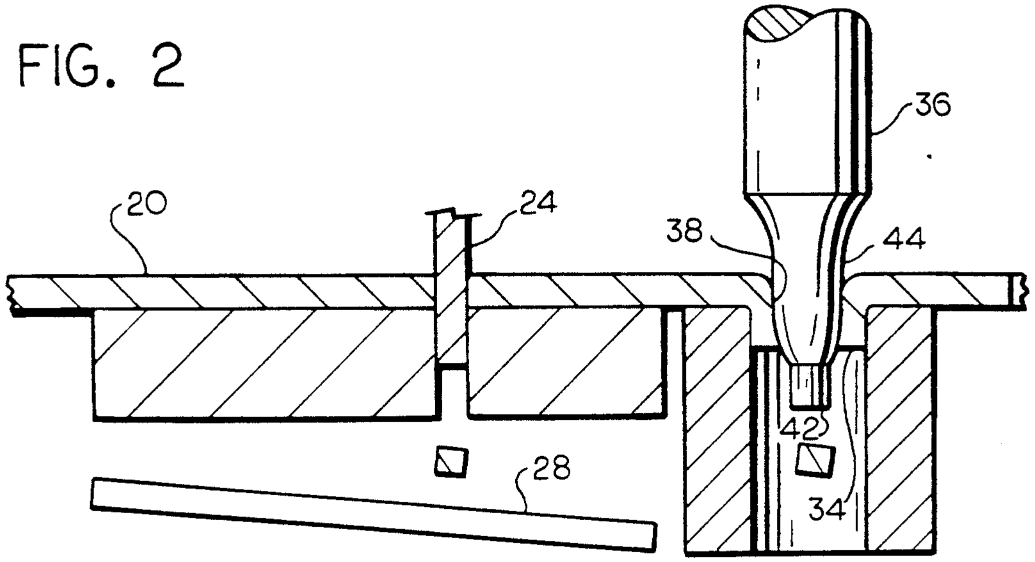

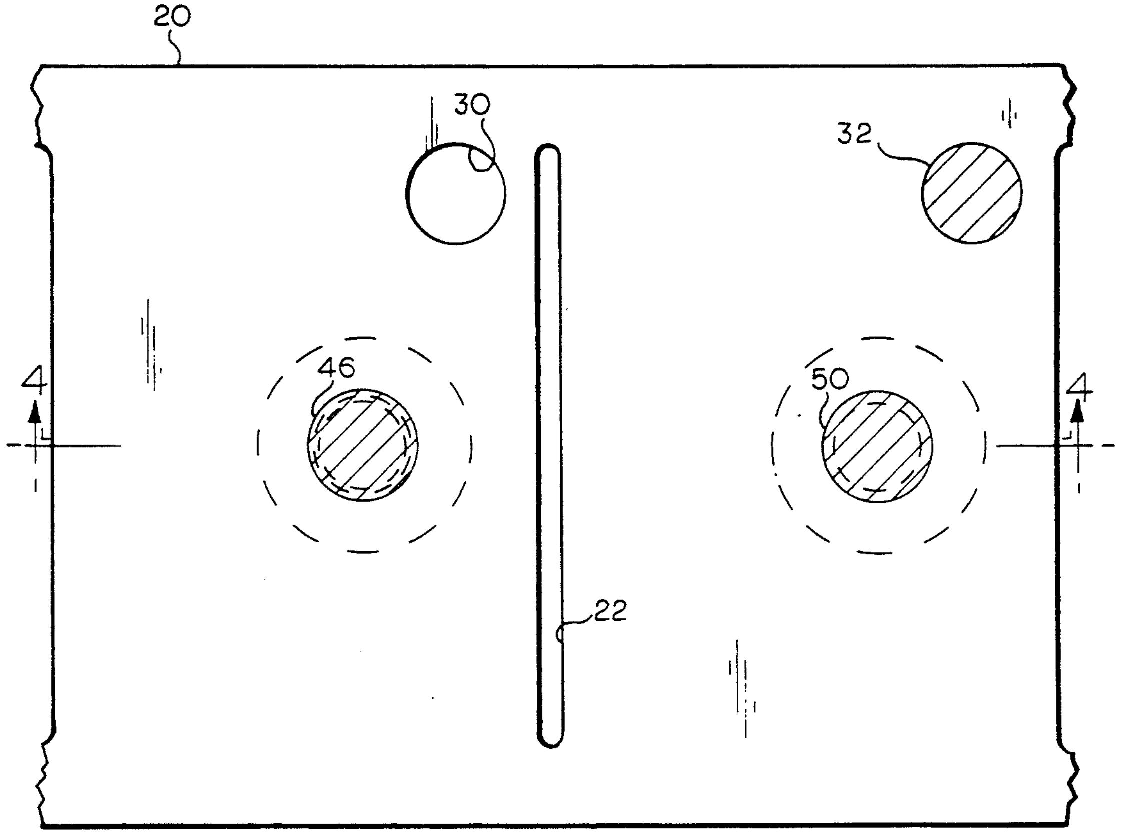
FIG. 3
FIG. 4
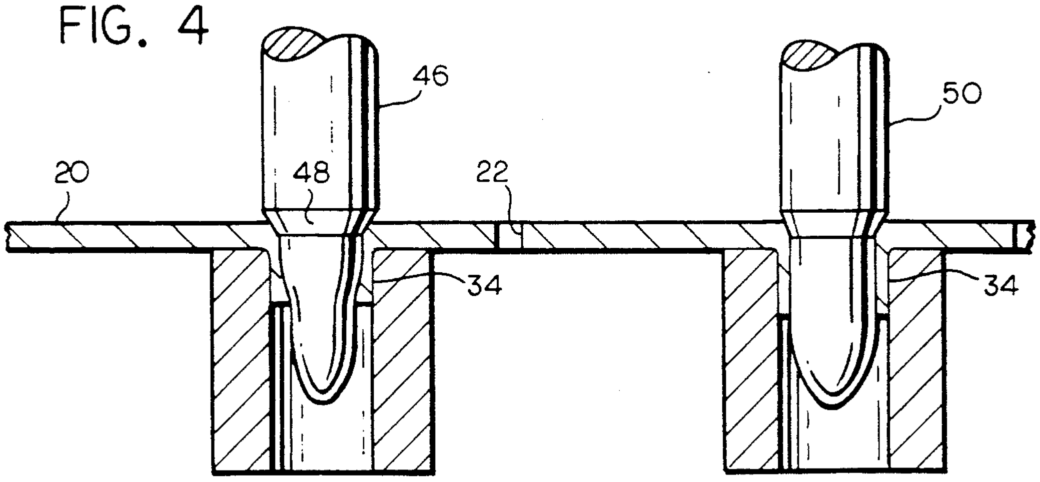

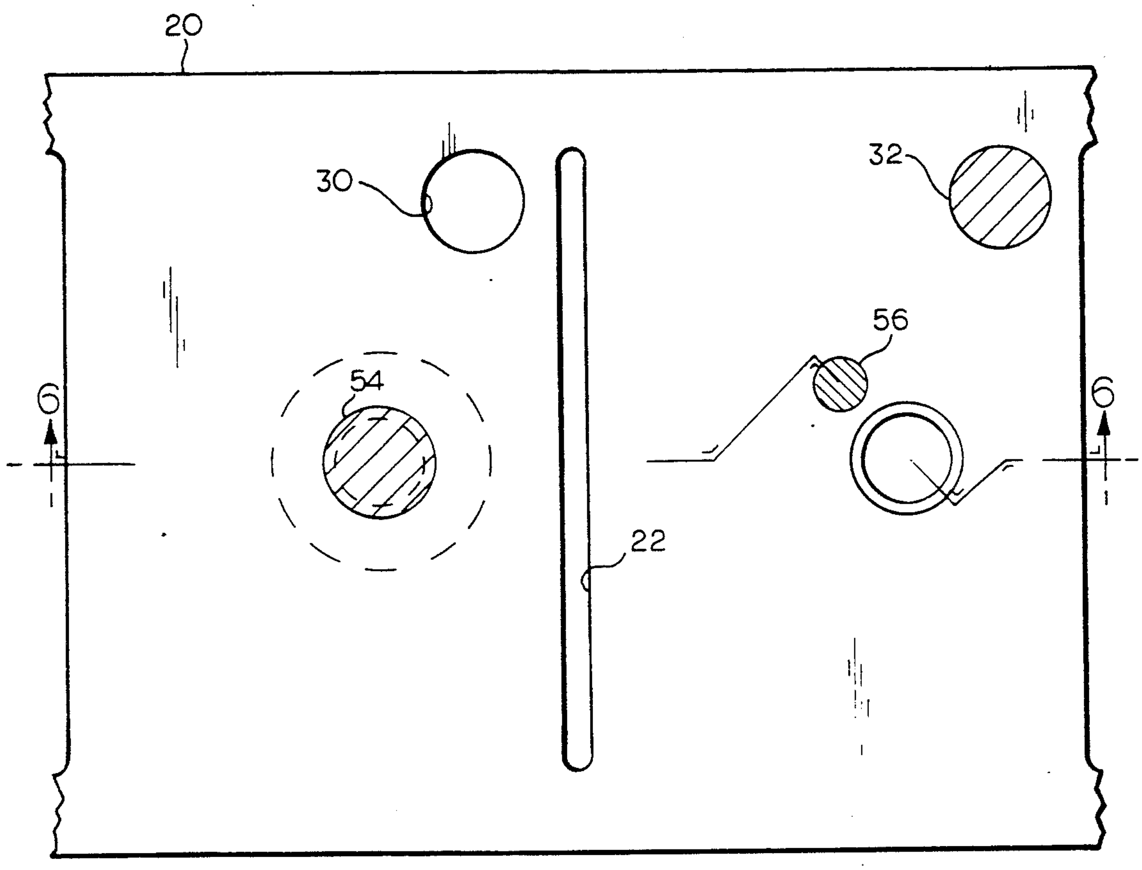
FIG. 5
FIG. 6
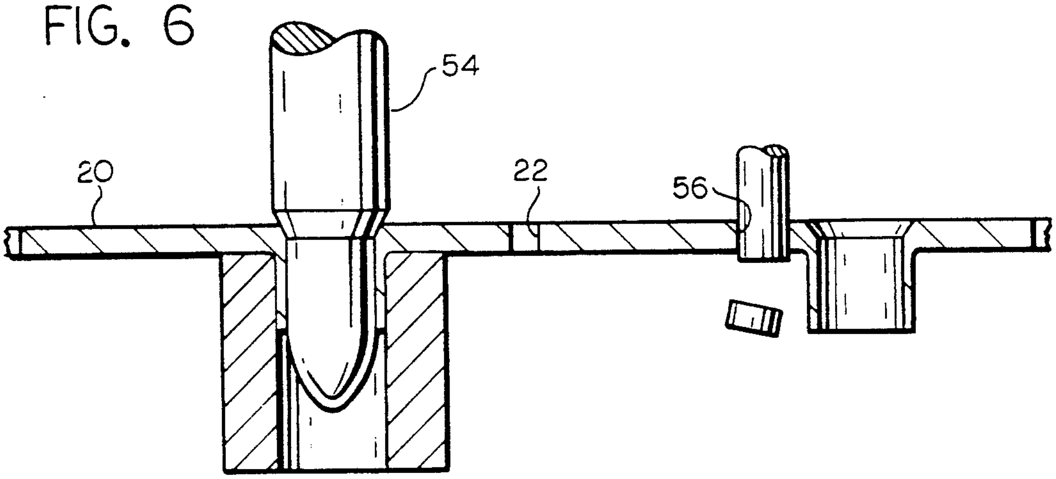

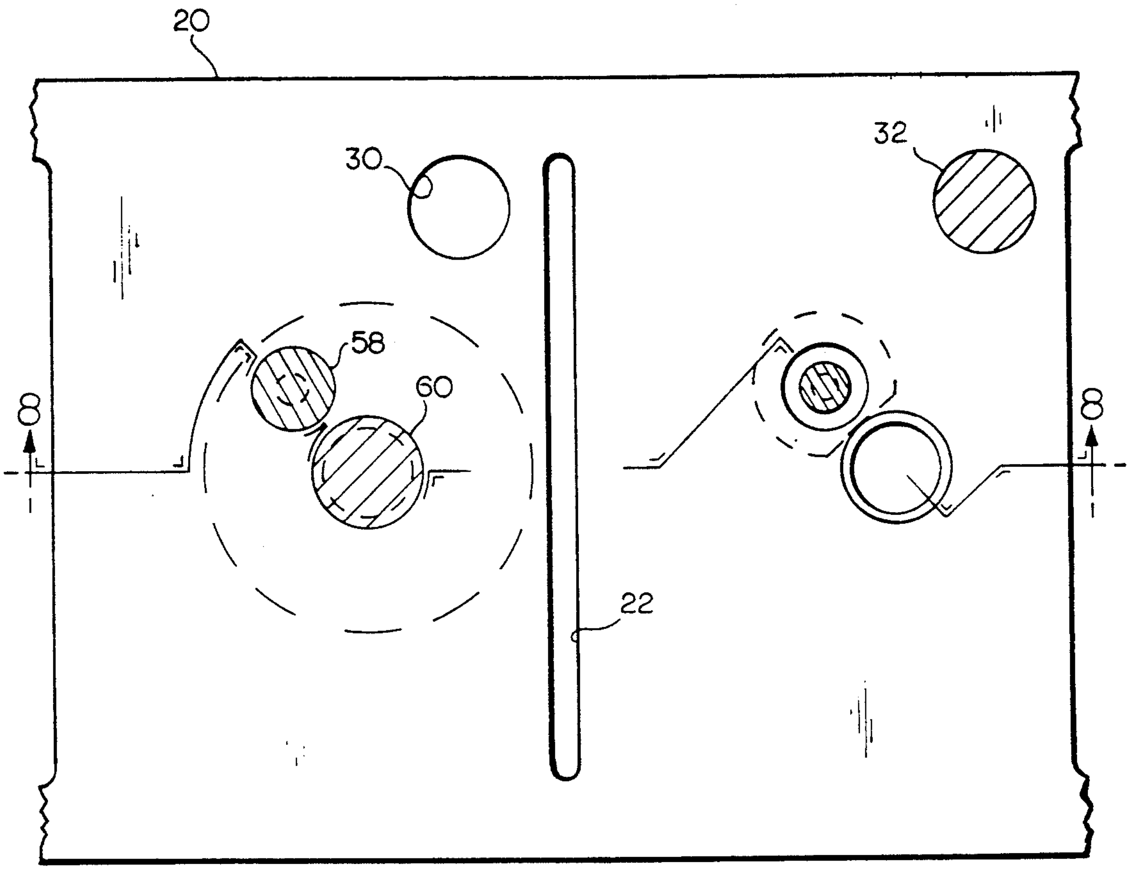
FIG. 7
FIG. 8
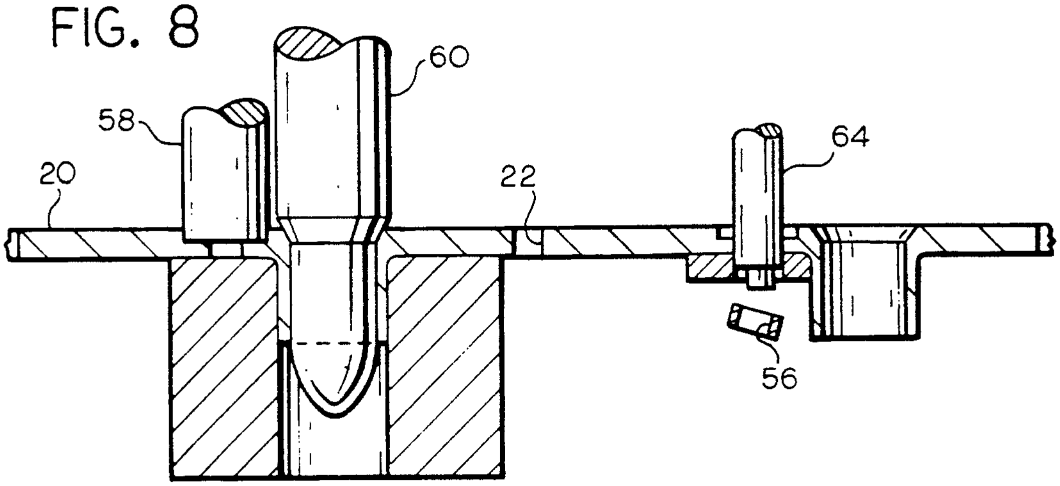

FUEL REGULATOR MOUNTING PLATE AND FORMING PROCESS

BACKGROUND OF THE INVENTION

This invention pertains to an improved metal plate for mounting a fuel pressure regulator on a fuel injection rail assembly of an internal combustion engine. More specifically, it relates to a fuel regulator mounting plate which has an elongated tubular nipple integrally formed by a stamping process from a flat strip of sheet metal stock.

Fuel pressure regulators are being redesigned in order to improve their fuel connections and thereby make them easier and more economical to install on a fuel rail. The currently preferrred regulator design has a plug-in type fuel connection for its high pressure supply side and a less pressure resistent connection in close proximity thereto for its lower pressure fuel return side. The male portion of the high pressure connection protrudes from the pressure regulator and is sufficiently long to accommodate two axially spaced apart "O"-ring seals required to produce an effective seal at the pressure involved. The axial length required for a corresponding female portion of the high pressure connection located on the mounting plate was such that it could not be formed as an integral part of the mounting plate by state-of-the-art stamping processes. It would have to be made as a separate tubular nipple and attached to the plate. The separate steps of manufacturing a nipple element and then attaching it to a regulater mounting plate would add significantly to the cost of a completed plate. The requirement of having an uninterrupted smooth surface on the inside of the junction of the plate and nipple presented manufacturing problems. It was essential to have this smooth uninterrupted surface to prevent damage to the "O" ring seals when the pressure regulator was being inserted into the nipple. The maximum protruding length of an extruded tubular nipple formed by state-of-the-art stamping processes under ideal conditions was twice the thickness of the stock. Accordingly, when a longer than normal extruded nipple was required, it could only be produced by increasing the thickness of the stock, which in the instant case was undesirable. Another limitation of state-of-the-art stamping processes was that in plastically forming a projecting nipple of maximum length the surrounding sheet stock within a radius equivalent to three times the thickness of the stock was affected and as a result no formed feature could be located within this distance.

Accordingly, it is a general object of this invention to provide an improved fuel regulator mounting plate of simplified construction that is easy and economical to produce repeatedly with precision.

It is another object of this invention to provide a one piece fuel regulator mounting plate having an elongated tubular nipple integrally formed by a stamping process from planar metal stock of minimum thickness, wherein the projecting length of the nipple is more than two times the thickness of the plate stock.

It is yet another object of this invention to provide an improved fuel regulator mounting plate which has an integrally formed elongated nipple located in close proximity to another formed feature in the plate.

SUMMARY OF THE INVENTION

Generally speaking, the improved fuel regulator mounting plate includes an elongated tubular nipple that has been plastically formed from the sheet metal stock of the plate by a stamping process utilizing specially shaped progressive die members. An intermediate die member forms an intermediate tubular nipple shape in which the wall thickness of a distal end portion thereof is greater than the wall thickness of the end portion adjacent to the plate. A subsequent die member enters the tubular preform and completes the formation of the nipple by reducing the excess wall thickness while it axially extends the nipple to its predetermined length. Preferably, a finishing die irons and coins the interior surfaces of the nipple including its entrance. The resultant tubular nipple has a streamlined entrance, a smooth work hardened side wall of substantially uniform thickness and a protruding length that exceeds twice the thickness of the plate stock from which it was formed. The interior length of the tubular nipple is sufficient to accomodate two axially spaced apart "O" ring seals carried on a male connector fitment for a high pressure fuel supply line of a fuel pressure regulator. Another plastically formed feature, comprising an aperture with a surrounding recessed annular flat, is located in close proximity to the tubular nipple entrance.

BRIEF DESCRIPTION OF THE DRAWINGS

FIG. 1 is a plan view of a broken away portion of a strip of sheet metal stock overlying the first die station of a series of die stations of a progressive stamping die with the male die members shown in cross section, FIG. 2 is essentially a sectional side view taken along lines 2—2 of FIG. 1, but with a compound punch and extrusion die shown in full, FIG. 3 is a plan view similar to that of FIG. 1, but of a preceeding portion of the sheet metal strip overlying the second and third stations of the progressive stamping die, FIG. 4 is a sectional side view similar to FIG. 2 taken along lines 4—4 of FIG. 3, FIG. 5 is a plan view similar to that of FIG. 3, but of a preceeding portion of the sheet metal strip overlying the third and fourth stations of the progressive stamping die, FIG. 6 is a sectional side view similar to FIG. 4 taken along lines 5—5 of FIG. 5, FIG. 7 is a plan view similar to that of FIG. 5, but of a preceeding portion of the sheet metal strip overlying the fifth and sixth stations of the progressive stamping die, FIG. 8 is a sectional side view similar to FIG. 6 taken along lines 7—7 of FIG. 7.

Figure 9:
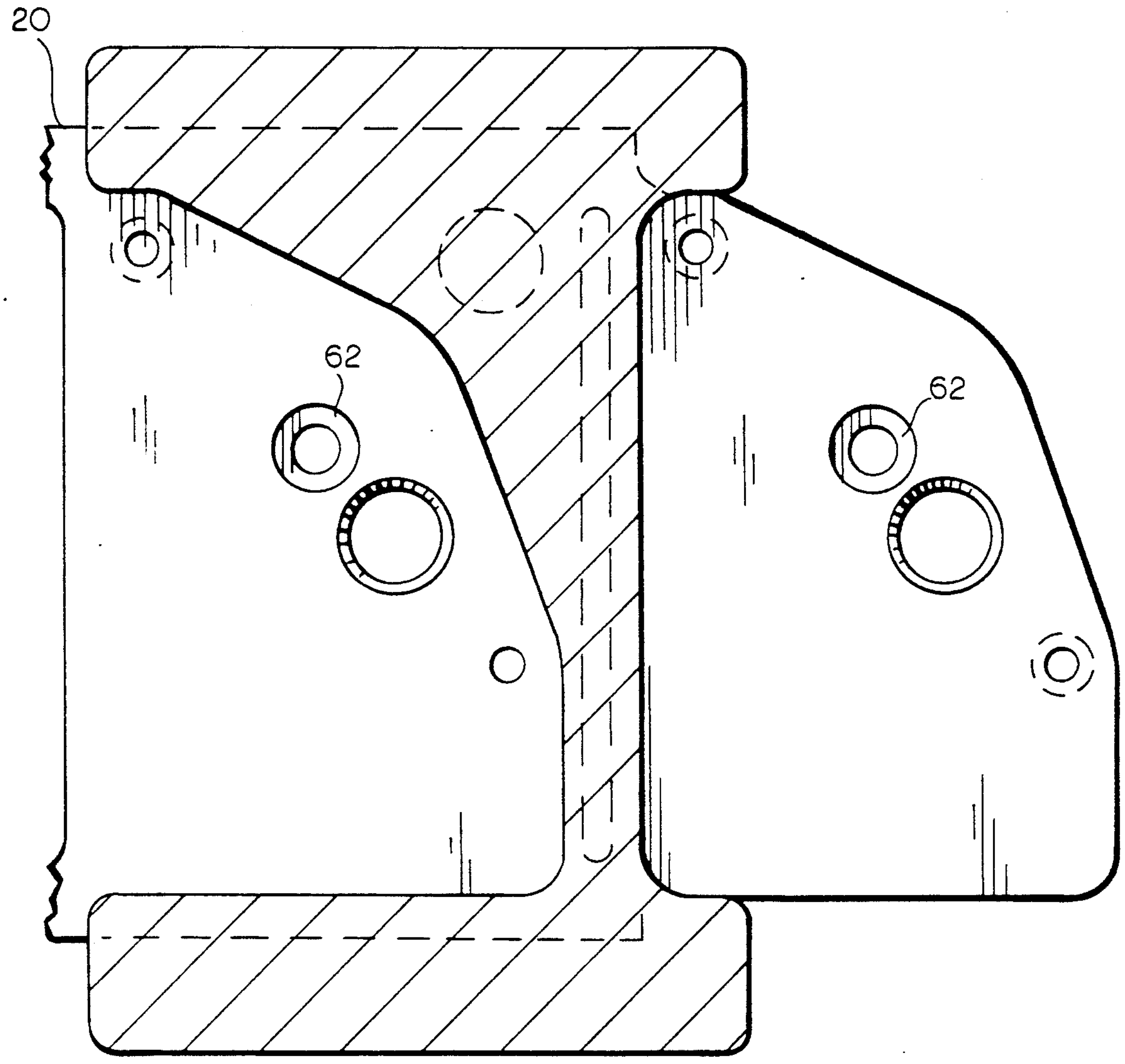
FIG. 9 is a plan view of the first portion of the sheet metal strip overlying the remaining stations of the progressive die.

The inventive features of the mounting plate and its forming process will be understood best if the following description is read with reference to the accompanying drawings.

DETAILED DESCRIPTION OF THE INVENTION

Referring first to FIGS. 1 and 2, it should be noted that a continuous strip of sheet metal stock 20 is advanced progressively by stepping action from the left of the drawings to the right. At the first station on the left a lateral slot 22, having approximately the same length as a corresponding edge of a finished plate, is produced by a slot punch 24. Simultaneously, a pair of parallel shearing die members 26, located on opposite sides of the strip, sever narrow rectangular sections 28 from the strip edges to produce so-called pitch notches. The length of a pitch notch is equal to the length of a plate blank and the square shoulders at the upstream ends of the notches are used as points of registry so that a succeeding portion of the metal strip can be precisely positioned as it is fed into the first station of a progressive die. At the second station, on the right side of the drawing, a relatively large diameter stabilizer hole 30 is produced adjacent to an edge of the strip in an area lying outside the footprint of the plate to further insure that the strip portion can be precisely located and firmly held in postion by means of a series of pilot pins 32 while being worked upon at subsequent die stations. Concurrently, a tubular nipple preform 34 is produced by a die having a male die member 36 with a punch on its leading end which first pierces a small diameter circular pilot hole at the center of the site where the extruded tubular nipple member is to be formed. Then as the male die member continues to be advanced through the pierced hole an enlarged contoured body section 38 forces a surrounding annular portion of the metal stock downwardly into a cylindrical die cavity member 40 and outwardly against the walls thereof. The contoured body section 38 of the male die member increases in diameter from its punch end 42 to its head end 44. The rate of increase is greater adjacent to the punch end of the contoured section and gets progressively less thereafter as the last working portion adjacent to the head end of the contoured section is approached. Accordingly, the contoured body section of the male die member rams an annular portion of the metal at the extrusion site into the die cavity and reduces its thickness by a certain percentage at the top of the cavity and by a lesser percentage at its distal end. With the reduction in wall thickness there is a corresponding increase in the length of the nipple preform.

In the instant case the thickness of the metal stock is 3.12 millimeters, the diameter of circular punch-out is 4.06 millimeters, the die cavity diameter is 12.07 millimeters and the diameter of the contoured male die body taken at a level with the top of the die cavity is 7.37 millimeters. It is to be noted that the difference between the maximum diameter of the male die member and cavity is substantially less than twice the thickness of the metal stock at the entrance end of the cavity when the male die member is at the bottom of its stroke. With this arrangement the wall thickness of the nipple preform adjacent to the plate is nominally 75% of the original plate thickness and the wall thickness at the distal end of the nipple preform is much greater than that adjacent to the plate. This relationship is essential to the extrusion forming of nipples having exceptional length on plate stock of minimum thickness.

During the second stage of the extrusion, which occurs at the third station shown on the left sides of FIGS. 3 and 4, a second contoured male die member 46 having larger lateral proportions than that of its preceeding die member 38 is used to further thin the wall of the preform and extend its length. At this stage the diameter of the male die member is 10.16 millimeters which results in a reduction of the preform wall thickness of about 60% and again a corresponding increase in length. It is at this stage that the greatest amount of reduction in the wall thickness occurs. Although the wall thickness of the second stage preform is reduced overall relative to the wall thickness of the first preform, the wall portion adjacent to the remote end still remains thicker than the wall portion adjacent to the entrance end of the die cavity. Additionally, the second male extrusion die member 46 has an annular chamfering section 48 at its head end, which bevels and streamlines the entrance opening on the top of the regulator plate. Preferably, the chamfering surface of the die member is at an angle of 19-20 degrees relative to its longitudinal axis and the streamlining produced by this chamfering section extends into the top of the plate a depth of 1.7 millemeters. This depth is more than half the thickness of the plate.

The third extrusion die member 50 shown at the fourth die station on the right side of FIGS. 3 and 4, has a bullet shaped nose and a substantially cylindrical body. The diameter of the upper body portion of this die member is 10.41 millemeters which results in a reduction of the wall thickness at the top of the preform of about 3% from that of a corresponding location on the preform at the completion of the previous stage. However, a much greater reduction occurs in the wall thickness at the distal or bottom end of the preform.

The sizing and finishing operation on the nipple preform is performed at the fifth die station shown on the left sides of FIGS. 5 and 6. Here again the male die member 54 has a bullet shaped nose and a substantially cylindrical body but it is highly polished so as to be capable of producing a smooth surface having a roughness of 1.6 microns or less on the inside of the nipple. The body section of the die member which has a diameter of 10.54 millimeters extends to the distal end of the nipple so that the nipple bore is substantially cylindrical. The word "substantially" as used here and throughout the specifications is meant to allow for rounding off of numbers and for any minor deviation required for die draft.

At the sixth die station the formation of an annular seat for the low pressure connection of the fuel pressure regulator is commenced by punching a hole 56 in the plate in close proximity to the nipple element for the high pressure side connection. A flat headed coining die member 58 stamps an annular recessed seat in the metal around hole 56 and in the process extrudes the displaced metal into hole 56 partially closing it. It is important to note that throughout this coining step, a die member 60 comparable to die member 54 is positioned in the nipple preform to prevent it from being distorted as a result of the coining operation being performed closely adjacent thereto. The actual separation between these two formed features is 0.82 millimeters which is equivalent to 0.26 times the thickness of the plate stock. In the past the norm was that no formed feature could be located closer to an extruded nipple element than a distance equal to three times the thickness of the plate stock. The low pressure connector element 62 of the plate is completed at the next station, shown on the left sides of FIGS. 7 and 8, by a die member 64 which punches the excess material surrounding hole 56 from the center of the coined flat seat.

Another significant feature is the ratio between the wall thickness "t" of the extruded nipple member relative to the thickness "T" of the plate stock from which it is formed. In the instant case the t/T ratio is markedly less than 0.5 and in fact is about 0.24. A ratio no less than 0.5 had been the accepted prior art norm even for highly workable metals.

Figure 10:
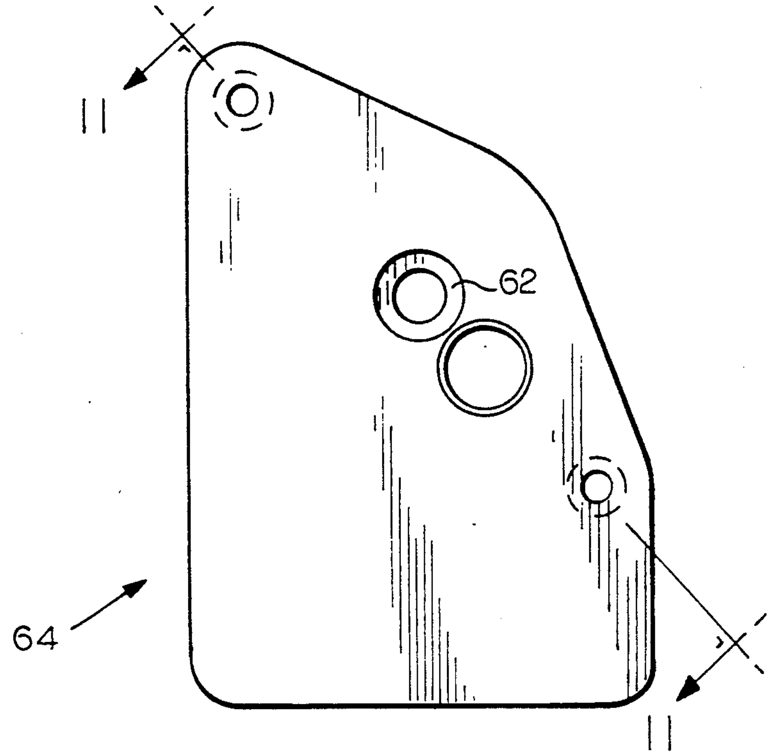
FIG. 10 is a plan view of slightly reduced size of the finished fuel pressure regulator plate.
Figure 11:
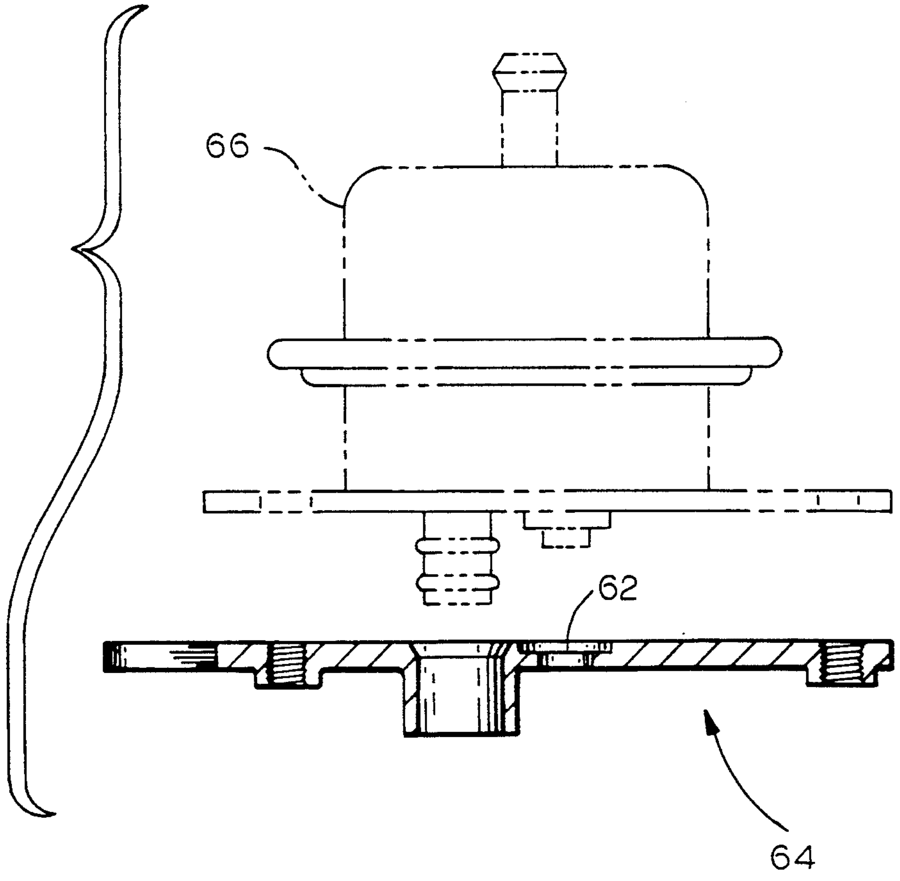
FIG. 11 is a sectional view of the finished plate taken along lines 11—11 of FIG. 10.

Plan and sectional views of the completed regulator mounting plate 64 are shown respectively in FIGS. 10 and 11 of the drawings. In FIG. 11 a fuel pressure regulator 66 (shown phantom lines) is positioned above the plate in alignment with it. The regulator 66 is equipped with two axially spaced apart "O" ring seals on its high pressure side connector element and a resilient annular seal on its low pressure side connector element. A fluid tight connection is made by merely bringing the aligned regulater and plate together and securing them with two screws (not shown).

While the improved fuel regulator plate has been described with respect to a single preferred embodiment, it is to be understood that the above disclosed teachings can be adapted to the production of similar items and that the scope of the invention is defined primarily by the appended claims.

What is claimed is:

1. A mounting plate for a fixture with an insertable connector, said mounting plate comprising: a sheet metal plate having a thickness T, an integrally formed extruded tubular nipple member projecting from one side of said plate, said nipple member having a projecting axial length equivalent to at least 2T measured from said one side and said nipple member is located within 0.26T of another element formed in said plate.

2. A mounting plate according to claim 1 wherein said formed element is a recessed annular seat surrounding an aperture.

3. A mounting plate for a fixture with an insertable connector, said mounting plate comprising: a sheet metal plate having a thickness T, an integrally formed extruded tubular nipple member projecting from one side of said plate, said nipple member having a projecting axial length equivalent to at least 2T measured from said one side, said extruded tubular nipple member has a wall thickness to plate thickness ratio of less than 0.3.

4. A mounting plate for a fixture with an insertable connector, said mounting plate comprising: a sheet metal plate having a thickness T, an integrally formed extruded tubular nipple member projecting from one side of said plate, said nipple member having a projecting axial length equivalent to at least 2T measured from said one side, said nipple member having a wall thickness to plate thickness ratio of less than 0.3, and another formed element located within a distance equivalent to less than 1T from said nipple member.

5. A mounting plate according to claim 4 wherein said formed element is a recessed annular seat surrounding an aperture.

6. A Process for forming a metal plate with an integrally formed tubular nipple projecting from one surface of said plate a distance equivalent to at least twice the thickness of said plate, said process comprising the steps of stepwise feeding a strip of sheet metal stock into a progressive die, piercing a small diameter pilot hole in the center of a nipple site, producing a nipple preform by plastically pressing an annular portion of the metal stock surrounding said pilot hole into a cylindrical die cavity and against the wall of said cavity and reducing the thickness of the surrounding metal by means of a male extrusion die member having a contoured body, said extrusion die being contoured such that said nipple preform has a greater wall thickness at its distal end than at the attached end, advancing said strip to a subsequent die station of said progressive die, plunging a second male extrusion die member having a contoured body of larger proportions than said first extrusion die member into said nipple preform to reduce the wall thickness throughout said preform while maintaining a greater wall thickness at its distal end than at its attached end, advancing said strip to a subsequent die station of said progressive die, plunging a third male extrusion die member having a bullet shaped head and a cylindrical body into said nipple preform to further reduce the wall thickness of said nipple preform and to make the wall thickness thereof less than one-half the plate thickness and uniform from one end to the other, advancing said strip to a subsequent die station of said progressive die and plunging a polished male die member into said preform to produce a smooth work hardened surface on the interior thereof.

7. A process according to claim 6 further including the step of producing another formed element closely adjacent to said nipple while said polished male die member is in said nipple preform, said another element being within a distance equivalent to less than the thickness of the metal plate.

* * * * *